United States Patent [19]

Martin

[11] Patent Number: 5,174,675
[45] Date of Patent: Dec. 29, 1992

[54] GUIDE BAR FOR AN ELEVATOR DOOR
[75] Inventor: Adolf H. Martin, Glenview, Ill.
[73] Assignee: Inventio AG, Hergiswil, Switzerland
[21] Appl. No.: 814,209
[22] Filed: Dec. 20, 1991

Related U.S. Application Data
[63] Continuation of Ser. No. 520,237, May 7, 1990, abandoned.

[51] Int. Cl.$^5$ .......................... F16B 1/00; B66B 13/00
[52] U.S. Cl. ..................................... 403/4; 403/408.1; 187/56
[58] Field of Search ...................... 403/3, 4, 13, 14, 24, 403/25, 240, 405.1, 408.1, 404, 388; 187/51, 56

[56] References Cited

U.S. PATENT DOCUMENTS

| | | | |
|---|---|---|---|
| 2,733,786 | 2/1956 | Drake | 403/4 X |
| 3,028,937 | 4/1962 | Grabowski et al. | 403/3 |
| 3,077,960 | 2/1963 | Lang | 403/4 |
| 3,250,051 | 5/1966 | Cheris | 403/3 X |
| 3,523,390 | 8/1970 | McAulay, Jr. | |
| 3,986,318 | 10/1976 | McConnell | 403/408.1 X |
| 4,754,857 | 7/1988 | Urban | 403/4 X |
| 4,781,270 | 11/1988 | Holland | 187/56 |

Primary Examiner—Peter M. Ciomo
Attorney, Agent, or Firm—William J. Clemens

[57] ABSTRACT

A guide bar for an elevator door includes a beam having a plurality of attachment apertures formed therein for the attachment of a guide, sliding or roller. The apertures are arranged in a staggered pattern providing for numerous adjustment possibilities for the guide to accommodate variations between the door and a guide track for the door. The guide is attached to a first horizontal web of the beam and extends into a groove mortised into the door sill, whereby the elevator door is guided at the lower end along a predetermined sliding track. Each aperture is formed from three overlapping circular recesses, the center points of which form an isosceles triangles such that bolt heads of fasteners are supported on at least two thirds of their circumference by the first web. The center points of the recesses of the apertures are staggered with respect to the center points of each of the other recesses in a direction transverse of the first web by a step width to provide a plurality of adjustment possibilities.

8 Claims, 2 Drawing Sheets

GUIDE BAR FOR AN ELEVATOR DOOR

This application is a continuation of U.S. patent application Ser. No. 07/520,237 filed May 7, 1990 and now abandoned.

BACKGROUND OF THE INVENTION

The present invention relates generally to elevator door mechanisms and, in particular, to a guide bar for maintaining a lower end of a sliding elevator door in a track.

U.S. Pat. No. 3,523,390 shows a sliding door for an elevator, which door is guided at the lower end by a roller guide attached at the center of the door and engaged in a predetermined sliding track. An indicator shaft of the roller extends into a groove mortised in the door sill, which groove determines the sliding track. A beam located at the lower end of the door has rectangular openings formed therein arranged lengthwise and transversely to the beam, which openings are provided for receiving the end of the shaft and the shaft fastening means. The openings in the beam make it possible to compensate for deviations between the door and the groove in the sill during the assembly of the roller guide, by inserting the roller guide into a suitable one of the openings which are staggered with respect to each other.

The disadvantages of this known arrangement are that the sliding door cannot meet the present day requirements for close tolerances with regard to the equalization of structural deviations between the door and the sill. It is here that the present invention can assist. The guide bar according to the present invention solves the problem of providing a sliding door in which the equalization of structural deviations is improved during and after assembly.

SUMMARY OF THE INVENTION

An elevator door has mounted at its lower end a guide bar for engaging a predetermined track thereby determining a path for sliding movement of the door. The guide bar includes a supporting beam with at least one opening or attachment aperture for the installation for a fastening means for a guiding means which engages the track. The attachment aperture is selected at the time of installation from a plurality of such apertures arranged in a staggered manner which provide numerous adjustment possibilities for the guiding means.

An advantage achieved by the present invention is that precisely aligned sliding doors require smaller displacement forces for opening and closing which is especially crucial in the selection of the motor size of the associated motorized door drives. A further advantage lies in the fact that changes or shifts in the building structure occurring in the course of time can be accommodated by the maintenance service personnel by means of the precision adjustment provided by the sliding door guide bar according to the present invention.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
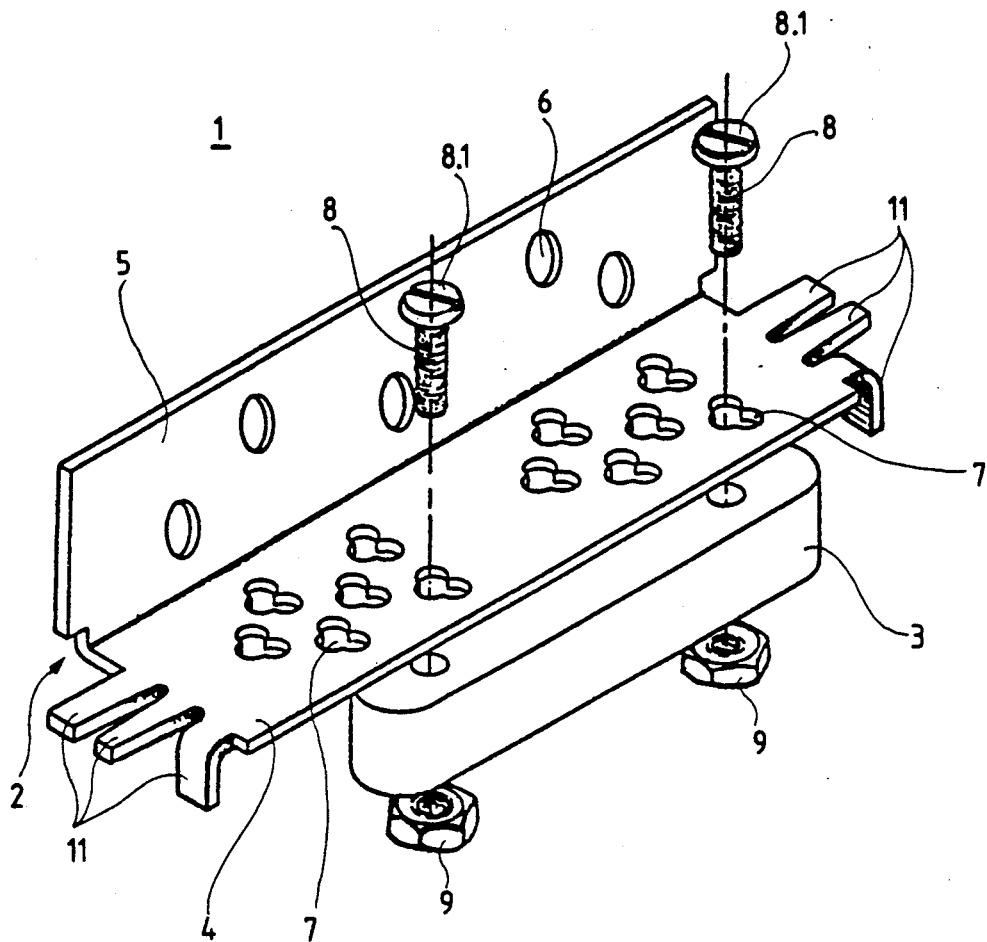
FIG. 1 is a perspective exploded view of an elevator guide bar according to the present invention.

Shown in FIG. 1 is a guide bar 1 utilized in the aligning of sliding elevator doors. The guide bar 1 includes an elongated, generally L-shaped cross section beam 2 attached to a guiding means in the form of a sliding guide 3 the beam 2 and the sliding guide 3 each extending longitudinally in the direction of travel of an elevator door. The beam 2 can be manufactured from a commercial cold rolled quality steel and formed with a first generally horizontally extending web 4 attached to a second generally vertically extending web 5 in a right-angled configuration. The surfaces of the beam 2 can be protected against corrosion by means of a cadmium layer or coating. For the attachment of the beam 2 to an elevator door (not shown), a plurality of fastener receiving mounting apertures 6 are formed in the second web 5. Two groups of attachment apertures 7 are formed in the first web 4 to accept suitable fastening means such as bolts 8 and nuts 9, which fastening means connect the sliding guide 3 with the first web 4. The sliding guide 3 can be molded of a durable nylon material and extends downwardly into a groove (not shown) mortised into the elevator door sill, whereby the elevator door is guided in a predetermined sliding track defined by the groove. In an alternate embodiment, roller guiding means (not shown) could be provided in place of the sliding guide 3.

Figure 2:
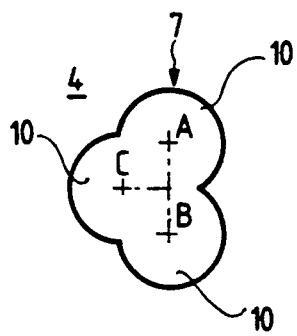
FIG. 2 is an enlarged top plan view of one of the fastener attachment apertures of the guide bar of FIG. 1.
Figure 3:
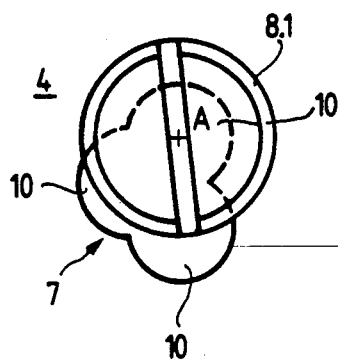
FIGS. 3 and 4 are views similar to FIG. 2 and show a fastener inserted in the aperture.
Figure 4:
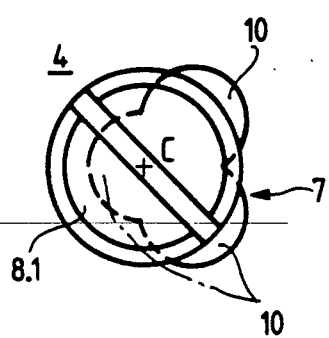
Figure 5:
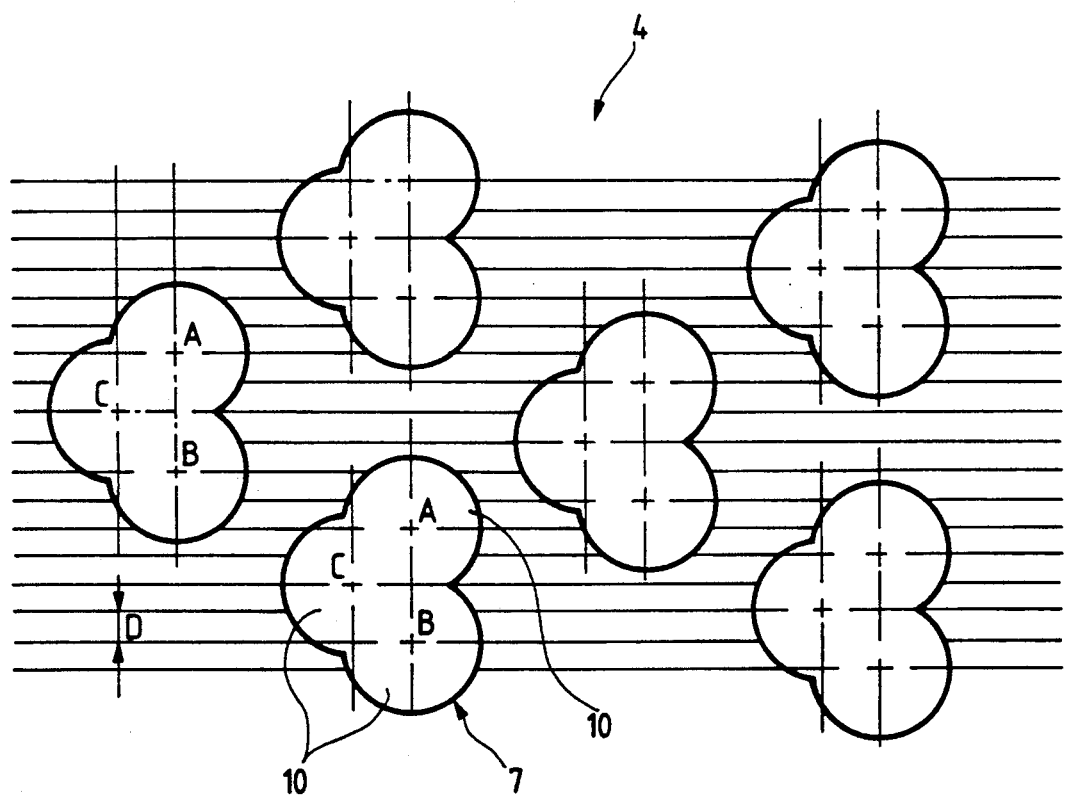
FIG. 5 is an enlarged top plan view of one of the groups of attachment apertures formed in the guide bar of FIG. 1.

In the embodiment shown in FIG. 1, six apertures 7 are provided in each of the two groups on the first web 4 for the accommodation of any structural deviations in the elevator door structure. Each opening 7 is formed from three intersecting circular recesses 10 as shown in FIGS. 2 through 5. The fastening means are inserted, depending on the necessary correction for any structural deviation, into the corresponding opening 7 and one of the associated recesses 10. Center points A, B and C of the three circular recesses 10 define the intersections of the three sides of an isosceles triangle, wherein a straight dashed line drawn from the point C is perpendicular to a straight dashed line drawn between the points A and B. The distance between the point C and the straight line between the points A and point B is one half of the distance between the points A and B as shown in FIG. 2. This relationship assures that a head 8.1 of the bolt 8 is supported on at least two thirds of its circumference by the first web 4 as shown in FIGS. 3 and 4. Designated with D in FIG. 5 is the smallest step width for accommodating a deviation in a direction transverse to the sliding axis of the first web 4. Eighteen generally parallel horizontally extending lines are shown, each one representing a location for a different one of the points A, B and C and a possible location for the center of the bolt 8. The lines are spaced apart by the predetermined step width D which corresponds to one quarter of the distance between the points A and B in each of the openings 7, the distance between the points A and B being the longest straight line distance between any two of the center points in the opening 7.

The openings 7, as shown in FIG. 5, are arranged in a pattern such that the central points A, B and C of the recesses 10 are displaced alternatingly by the step width D whereby each of the eighteen central points is aligned with a different one of the horizontal lines to provide eighteen possible points of attachment in comparison to the possibility of only six points of attachment provided by six similarly positioned conventional circular apertures.

Teeth 11 are formed on each end of the first web 4. Depending on the attached position of the sliding guide 3 on the beam 2, one of the teeth 11 is selected and bent downwardly to extend into but not touch the walls of the guiding groove (not shown) for the sliding guide 3. For example, in case the sliding guide 3 is destroyed by fire, the elevator door can be kept blocked since the bent teeth 11 will engage the groove.

In summary, a guide bar for an elevator door includes a beam adapted to be attached to an elevator sliding door a guiding means for engaging a groove and fastener means for attaching the guiding means to the beam. The beam has a generally horizontally extending web and a plurality of attachment apertures formed in the web, the attachment apertures being arranged in a staggered pattern providing at least as many possible points of attachment of the guiding means to the beam as the number of attachment apertures. The attachment apertures are each formed from three generally circular recesses having center points defining the intersections of the sides of an isosceles triangle and one of the center points being located along a straight line extending perpendicular to a straight line between the other two center points a distance one half of the distance between the other two center points.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An improvement in a guide bar for an elevator door including a beam adapted to be attached to an elevator sliding door, a guiding means for engaging a groove and fastener means for attaching the guiding means to the beam, the improvement comprising: a beam having a web and a sliding axis, a predetermined number of attachment apertures formed in said web and arranged in a staggered pattern, said attachment apertures each being formed from a plurality of overlapping recesses and a center point of each of said recesses being staggered with respect to each other one of said center points of said recesses in a direction transverse to the sliding axis of said beam by at least one of a predetermined step width equal to one quarter of a longest one of all straight line distances between all pairs of said center points of one of said attachment apertures whereby each of said recesses is adapted to cooperate with a fastening means to provide a different point of attachment of a guiding means to said beam.

2. The improvement according to claim 1 wherein said web is a first web having said attachment formed therein and said beam includes a second web attached to and extending at a right angle to said first web and having door mounting apertures formed therein.

3. The improvement according to claim 1 including a plurality of teeth for the emergency locking of an elevator door attached to said beam provided on each end of said web.

4. The improvement according to claim 1 including a guiding means formed as a sliding guide attached to said beam by fastener means extending through selected ones of said apertures.

5. The improvement according to claim 1 including a guiding means formed as a roller guide attached to said beam by fastener means extending through selected ones of said apertures.

6. A guide bar for an elevator door comprising:
a beam adapted to be attached to an elevator sliding door, said beam having a web and a sliding axis, a plurality of attachment apertures formed in said web in two spaced apart groups, each of said attachment apertures being formed from three generally circular overlapping recesses having center points defining all intersections of three sides of an isosceles triangle and one of said center points being located along a straight line extending perpendicular to a straight line between the other two center points a distance one half of the distance between the other two center points, and each of said center points being staggered with respect to all other ones of said center points associated in one of said groups in a direction transverse of the sliding axis of said beam by at least one of a predetermined step width equal to one quarter of the straight line distance between said two center points;
a guide means for extending into a guide track; and
fastener means for attaching said guide means to said beam in cooperation with a selected one of said attachment apertures in each of said groups.

7. In a guide bar for an elevator door including a beam adapted to be attached to an elevator sliding door, a guiding means for engaging a groove and fastener means for attaching the guiding means to the beam, the beam comprising:
a first generally horizontally extending web having two groups of six attachment apertures each formed therein, said groups being spaced apart along a sliding axis of said beam, said attachment apertures each being formed from three overlapping recesses and a center point of each of said recesses being staggered with respect to said center points of all of the other ones of said recesses associated in one of said groups in a direction transverse to the sliding axis of said beam by at least one of a predetermined step width equal to one quarter of a longest one of al straight line distances between all pairs of said center points of one of said attachment apertures, said three center points of each of said recesses defining all intersections of three sides of an isosceles triangle and one of said center points being located along a straight line extending perpendicular to a straight line between the other two center points a distance one half of the distance between the other two center points; and
a second generally vertically extending web having mounting apertures formed therein for attachment to an elevator door, said second web extending at right angles to and attached to said first web.

8. The guide bar according to claim 7 including a plurality of teeth for the emergency locking of an elevator door attached to said beam provided on each end of said first web.

* * * * *